(12) United States Patent
Vincitore et al.

(10) Patent No.: US 8,673,511 B2
(45) Date of Patent: Mar. 18, 2014

(54) APPARATUS INCLUDING SODIUM CHLORATE ELECTROLYSIS CELL CONNECTED BY WATER COOLED CATALYTIC REACTOR TO PHOSPHORIC ACID FUEL CELL

(75) Inventors: Antonio M. Vincitore, South Windsor, CT (US); Peter F. Foley, Manchester, CT (US); Derek W. Hildreth, Manchester, CT (US); John L. Preston, Hebron, CT (US)

(73) Assignee: United Technologies Corporation, Hartford, CT (US)

( * ) Notice: Subject to any disclaimer, the term of this patent is extended or adjusted under 35 U.S.C. 154(b) by 396 days.

(21) Appl. No.: 12/998,327

(22) PCT Filed: Nov. 17, 2008

(86) PCT No.: PCT/US2008/012890
§ 371 (c)(1),
(2), (4) Date: Apr. 8, 2011

(87) PCT Pub. No.: WO2010/056228
PCT Pub. Date: May 20, 2010

(65) Prior Publication Data
US 2011/0195326 A1    Aug. 11, 2011

(51) Int. Cl.
*H01M 8/06*    (2006.01)
*H01M 16/00*    (2006.01)

(52) U.S. Cl.
USPC ............... 429/422; 429/9; 429/413; 429/416

(58) Field of Classification Search
USPC ...................... 429/9, 422, 413, 416
See application file for complete search history.

(56) References Cited

U.S. PATENT DOCUMENTS 4,778,579 A * 10/1988 Levy et al. .................. 205/337

FOREIGN PATENT DOCUMENTS

WO    WO 2008016361 A1 *  2/2008

* cited by examiner

*Primary Examiner* — Sean P Cullen
(74) *Attorney, Agent, or Firm* — M. P. Williams

(57) ABSTRACT

A sodium chloride electrolysis cell (9) receives a portion of its electrical power (47, 48: 50, 51) from a phosphoric acid fuel cell (44) which receives fuel at its anode inlet (43) from a water cooled catalytic reactor (26) that converts oxygen in the byproduct output (19) of the sodium chlorate electrolysis cell to hydrogen and water. A utility grid (53) may provide through a converter (55) power to support the electrochemical process in the sodium chlorate electrolysis cell. Temperature of the water cooled catalytic reactor is determined by the vaporization of pressurized hot water, the pressure of which may be adjusted by a controller (36) and a valve (38) in response to temperature (40).

3 Claims, 1 Drawing Sheet

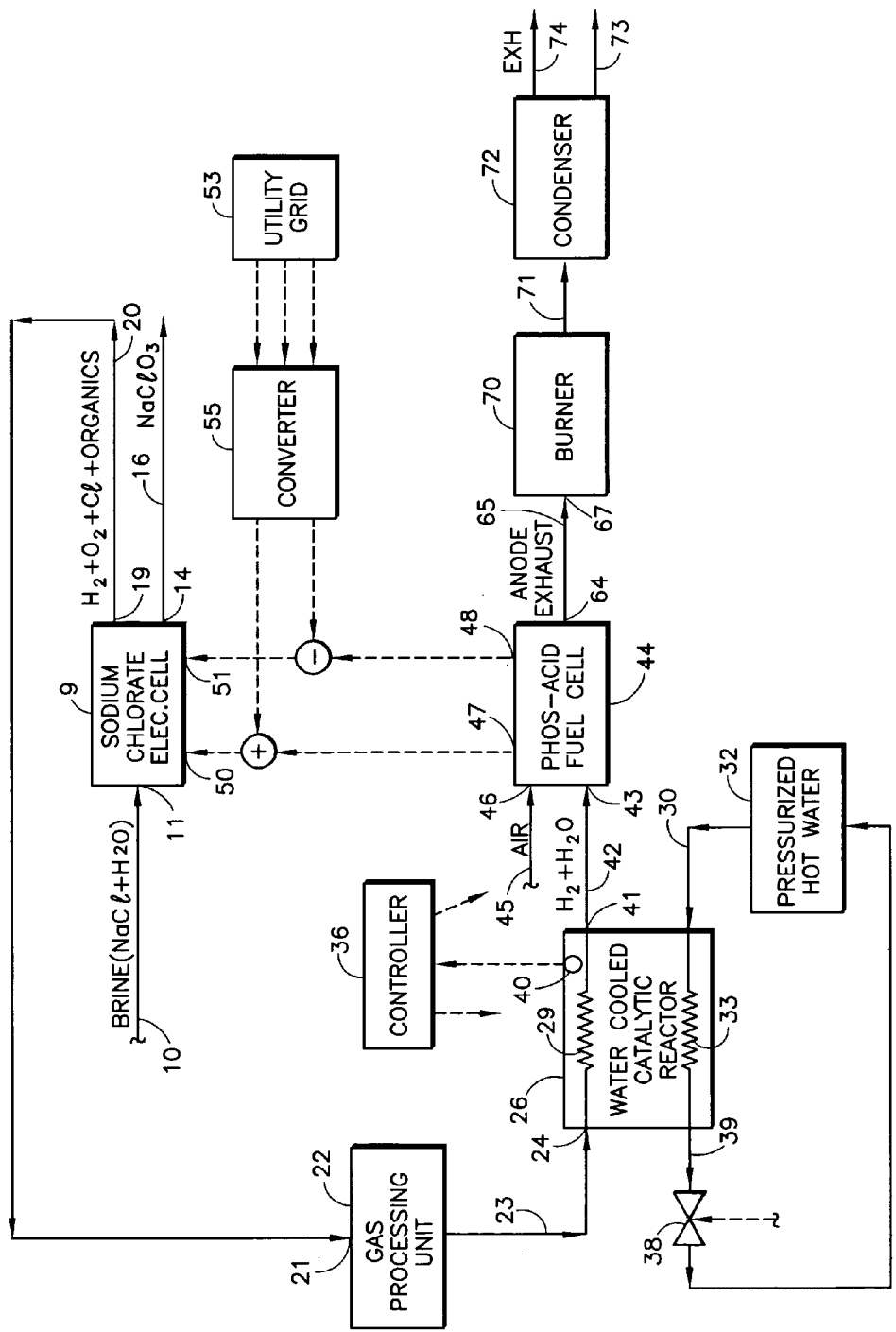

APPARATUS INCLUDING SODIUM CHLORATE ELECTROLYSIS CELL CONNECTED BY WATER COOLED CATALYTIC REACTOR TO PHOSPHORIC ACID FUEL CELL

TECHNICAL FIELD

A sodium chlorate-producing electrochemical cell is powered by a fuel cell, which uses the byproducts of the electrochemical cell as fuel.

BACKGROUND ART

Sodium chlorate, $NaClO_3$, being a powerful oxidizing agent, is used in the manufacture of matches and soft explosives, in calico printing, as a garden weed killer, etc. Heretofore, it has typically been prepared by the reaction of chlorine on hot, concentrated sodium hydroxide. The sodium hydroxide in turn being made from the electrolysis of brine ($NaCl + H_2O$) using one of a variety of diaphragm cells.

The byproduct stream of a sodium chlorate electrolysis cell contains hydrogen and oxygen, some chlorine and organics. The sale of the hydrogen would be economically effective if it were pure, but the purification of the hydrogen to a suitable commercial grade is prohibitively expensive.

SUMMARY

The present modality stems from the realization that the byproducts of a sodium chlorate electrolysis cell can be used, with little modification, to fuel a phosphoric acid fuel cell, in which the incoming hydrogen may be accompanied by water, in the form of steam.

The byproducts of a sodium chlorate electrolysis cell are purified in a water cooled catalytic reactor and then utilized as fuel in a phosphoric acid fuel cell, the electrical output of which provides power to the sodium chlorate electrolysis cell. Power may be drawn from the utility grid to assist in powering the sodium chlorate electrolysis cell.

Typically, the present modality requires the provision only of some pressurized hot water to cool the catalytic reactor, and brine, in order to provide sodium chlorate and, potentially, electricity as products.

Other variations will become apparent in the light of the following detailed description of exemplary embodiments, as illustrated in the accompanying drawings.

BRIEF DESCRIPTION OF THE DRAWINGS

The sole FIGURE herein is a simplified schematic block diagram of the present modality.

Mode(s) of Implementation

Referring to the FIGURE, a sodium chlorate electrolysis cell 9 receives brine from a conduit 10 at its input 11. The principal product of the cell 9 at its output 14 is sodium chlorate in a conduit 16. The secondary, byproduct output 19 of the cell 9 provides a mixture of gases including hydrogen, oxygen, chlorine and organics in a conduit 20. The organics in the conduit 20 depend upon type and composition of the electrode where the $H_2$ gas is evolved, but may for instance include ethane, ethylene, propane, propylene, butanes and butenes, and perhaps traces of C5+ saturated and unsaturated hydrocarbons.

The byproducts in the conduit 20 are fed to an inlet 21 of a gas processing unit 22, typically a fixed bed filled with activated carbon, which removes the hydrocarbons and Cl. The gas is fed in a conduit 23 to the inlet 24 of a water cooled catalytic reactor 26 having a chamber 29. The water cooled catalytic reactor 26 may comprise a plate fin heat exchanger having catalysts disposed between the external surfaces of the plate fins 33, with high pressure hot water in a conduit 30 from a source 32 circulating inside the plate fins 33. In accordance with this modality, the catalytic reactor 26 can be considered a passive device in terms of controlling operating temperature. The pressure and temperature of coolant flow from the source 32 is set to control the reactor temperature within an acceptable range, given any variations in the content or quantity of the byproduct gases in the conduit 23. A controller 36 adjusts the pressure of the hot water in conduit 30 by controlling a valve 38 in an exit conduit 39, in response to variations in reactor temperature, within the aforementioned range of temperature, as indicated by a temperature sensor 40. As the reactor temperature increases, the water pressure is decreased according to a predetermined schedule. As a result, the system assures conversion of all the byproducts while sustaining the reactor temperature in a safe range.

The temperature of the pressurized hot water from the source may be greater than 163° C. (325° F.), but is in the liquid phase because of being at a pressure on the order of 1030 kPa (150 psia). When the reaction of the byproduct gases raises the temperature above about 180° C. (356° F.), the hot water will boil, producing steam, which keeps the temperature from rising above the vaporization temperature at the pressure of the hot water. This also provides passive control on the temperature within the cooled catalytic reactor 26, so that the catalyst is not harmed and there is no danger to the structural integrity of the vessel.

Within the water cooled catalytic reactor 26, the oxygen in the byproduct gas within the conduit 23 is reacted with some of the hydrogen to form water. Thus, the principal outflow of the water cooled catalytic reactor 26 at its outlet 41 is hydrogen and steam in a conduit 42. This is applied to the inlets 43 of anode fuel flow fields of a phosphoric acid fuel cell 44, which also receives air in a conduit 45 at the inlets 46 of the oxidant flow fields.

The phosphoric acid fuel cell 44 is tolerant of steam in the fuel flow fields, successfully operating for years on reformate from catalytic steam reformers, which typically contains about 25 mol percent steam. The fuel cell 44 generates DC power at its electric power outputs 47 and 48, which is applied to the electrical inputs 50, 51 of the sodium chlorate electrolysis cell 9. This provides part of the power for the conversion of brine to sodium chlorate by an electrolysis process. The balance of power is provided by a utility grid 53 through a converter 55.

The fuel cell 44 provides depleted hydrogen at anode exits 64 through a conduit 65 to an inlet 67 of a burner 70. The burner may provide heat to the source 32 or perform some other useful purpose within an adjacent facility. The exhaust outlet of the burner in a conduit 71 may be provided to a condenser 72 to extract the water therefrom at an outlet 73, prior to discharging the gaseous burner outflow to ambient atmosphere at an exhaust 74.

The invention claimed is:

1. Apparatus, comprising:
    a sodium chlorate electrolysis cell (9) configured to provide at a product output (14) sodium chlorate, and to provide at a byproduct output (19) a gas including hydrogen, oxygen, chlorine and organics;
    characterized by:

a phosphoric acid fuel cell (44) having an anode inlet (43) and providing electrical power (47, 48: 50, 51) to the sodium chlorate electrolysis cell; and the byproduct output (19) of said sodium chlorate electrolysis cell (9) is provided (21-24) to a water cooled catalytic reactor (26) which converts hydrogen and oxygen to water and having an output (41) which is applied (42) to the anode inlet (43) of the phosphoric acid fuel cell (44).

2. Apparatus according to claim 1 characterized in that the water cooled catalytic reactor (26) is cooled by pressurized hot water in a conduit (30) from a pressurized hot water source (32), having a pressure which is such that increase in temperature within said water cooled catalytic reactor causes the pressurized hot water to boil, thereby cooling the water cooled catalytic reactor.

3. Apparatus according to claim 1 characterized in that a pressurized hot water source (32) is configured to provide to the water cooled catalytic reactor (26), pressurized hot water in a conduit (30) having temperature and pressure which are such that increase in temperature within said water cooled catalytic reactor causes the pressurized hot water to boil, thereby cooling the water cooled catalytic reactor.

\* \* \* \* \*